US007079905B2

(12) United States Patent
Chang

(10) Patent No.: US 7,079,905 B2
(45) Date of Patent: Jul. 18, 2006

(54) TIME SCALING OF STEREO AUDIO

(75) Inventor: Kenneth H. P. Chang, Foster City, CA (US)

(73) Assignee: SSI Corporation, Tokyo (JP)

( * ) Notice: Subject to any disclaimer, the term of this patent is extended or adjusted under 35 U.S.C. 154(b) by 890 days.

(21) Appl. No.: 10/010,016

(22) Filed: Dec. 5, 2001

(65) Prior Publication Data

US 2003/0105539 A1 Jun. 5, 2003

(51) Int. Cl.
*G06F 17/00* (2006.01)
*G10L 21/00* (2006.01)

(52) U.S. Cl. ........................................ 700/94; 704/503

(58) Field of Classification Search .................. 700/94; 381/61, 101, 106, FOR. 103; 704/211, 500, 704/503; 369/60.01
See application file for complete search history.

(56) References Cited

U.S. PATENT DOCUMENTS 4,757,540 A * 7/1988 Davis ......................... 704/278
5,940,573 A * 8/1999 Beckwith ..................... 386/54
5,995,153 A * 11/1999 Moeller et al. ........ 375/240.01
6,049,766 A 4/2000 Laroche
6,278,387 B1 8/2001 Rayskiy
2002/0065569 A1 * 5/2002 Matoba ....................... 700/94

* cited by examiner

*Primary Examiner*—Sinh Tran
*Assistant Examiner*—Andrew C. Flanders
(74) *Attorney, Agent, or Firm*—David T. Millers

(57) ABSTRACT

A time scaling process for a multi-channel (e.g., stereo) audio signal uses a common time offsets for all channels and thereby avoids fluctuation in the apparent location of a sound source. In the time scaling process, common time offsets correspond to respective time intervals of the audio signal. Data for each audio channel is partitioned into frames corresponding to the time intervals, and all frames corresponding to the same interval use the same common time offset in the time scaling process. The common time offset for an interval can be derived from channel data collectively or from separate time offsets independently calculated for the separate channels. Preprocessing can calculate the common time offsets for inclusion in an augmented audio data structure that a low-processing-power presentation system uses for real-time time scaling operations.

5 Claims, 5 Drawing Sheets

TIME SCALING OF STEREO AUDIO

BACKGROUND

Time scaling (e.g., time compression or expansion) of a digital audio signal changes the play rate of a recorded audio signal without altering the perceived pitch of the audio. Accordingly, a listener using a presentation system having time scaling capabilities can speed up the audio to more quickly receive information or slow down the audio to more slowly receive information, while the time scaling preserves the pitch of the original audio to make the information easier to listen to and understand. Ideally, a presentation system with time scaling capabilities should give the listener control of the play rate or time scale of a presentation so that the listener can select a rate that corresponds to the complexity of the information being presented and the amount of attention that the listener is devoting to the presentation.

FIG. 1A illustrates representations of a stereo audio signal using stereo audio data 100 and time-scaled stereo audio data 110. Stereo audio data 100 includes left input data 100L representing the left audio channel of the stereo audio and right input data 100R representing the right audio channel of the stereo audio. Similarly, time-scaled stereo audio data 110, which is generated from stereo audio data 100, includes left time-scaled audio data 110L and right time-scaled audio data 110R.

A conventional time scaling process for the stereo audio performs independent time scaling of the left and right channels. For the time scaling processes, the samples of the left audio signal in left audio data 100L are partitioned into input frames IL1 to ILX, and the samples of the right audio signal in right audio data 100R are partitioned into input frames IR1 to IRX. The time scaling process generates left time-scaled output frames OL1 to OLX and right time-scaled output frames OR1 and ORX that respectively contain samples for the left and right channels of a time-scaled stereo audio signal. Generally, the ratio of the number m of samples in an input frame to the number n of samples in the corresponding output frame is equal to the time scale used in the time scaling process, and for a time scale greater than one, the time-scaled output frames OL1 to OLX and OR1 to ORX contain fewer samples than do the respective input frames IL1 to ILX and IR1 to IRX. For a time scale less than one, the time-scaled output frames OL1 to OLX and OR1 to ORX contain more samples than do the respective input frames IL1 to ILX and IR1 to IRX.

Some time scaling processes use time offsets that indicate portions of the input audio that are overlapped and combined to reduce or expand the number of samples in the output time-scaled audio data. For good sound quality when combining samples, this type of time scaling process typically searches for a matching blocks of samples, shifts one of the blocks in time to overlap the matching block, and then combines the matching blocks of samples. Such time-scaling processes can be independently applied to left and right channels of a stereo audio signal. As illustrated in FIG. 1B, for example, time offsets ΔTLi and ΔTRi from the beginnings of respective left and right buffers 120L and 120R uniquely identify blocks 125L and 125R best matching input frames ILi and IRi, respectively. Each best match block 125L or 125R can be arithmetically combined with the corresponding input frame ILi or IRi to generate modified samples for the output time-scaled data.

As illustrated in FIG. 1B, time offsets ΔTLi and ΔTRi corresponding to the same frame number (i.e., the same time interval in the input stereo audio) can differ from each other because the offsets are determined independently for left and right audio data 100L and 100R. Generally, the difference in the time offsets for left and right channels varies so that offset ΔTLi is shorter than offset ΔTRi for some frames (i.e., some values of frame index i) and ΔTRi is shorter than offset ΔTLi for other frames offset (i.e., other values of frame index i).

For stereo audio generally, when matching sounds from the same source are played through left and right speakers, a listener perceives a small difference in timing of the matching sounds as a single sound emanating from a location between the left and right speakers. If the timing difference changes, the location of the source of the sound appears to move. In time-scaled stereo audio data, an artifact of the variations in offsets ΔTLi and ΔTRi with frame index i is an apparent oscillation or variation in the position of the source of audio being played. Similarly, variations in the offsets ΔTLi and ΔTRi can cause timing variations in the related sounds in different channels such as different instruments played through different channels. These artifacts annoy some listeners, and systems and methods for avoiding the variations in the apparent position of a sound source in a time-scaled stereo audio signal are sought.

SUMMARY

In accordance with an aspect of the invention, a time scaling process uses a common offset for a corresponding interval of all channels of a multi-channel (e.g., stereo) audio signal. The use of the common time offsets for all channels avoids timing variations between matching or related sounds in the channels and avoids creating artifacts such as the apparent oscillation or variation in the location for a sound source. For better sound quality, the common time offset changes according to the content of the audio signal at different times and can be determined by a best match search.

One specific time scaling process for a multi-channel audio signal partitions the multi-channel audio signal into a plurality of time intervals. Each interval corresponds to multiple frames, one frame in each of the channels representing the multi-channel audio signal. For each interval, the processes determines a common time offset for use with all channels, and for each input frame, time scaling generates time-scaled data using a data block identified by the common offset for the time interval corresponding to the frame. Generally, the time scaling combines each sample of the identified block with a corresponding sample of the corresponding input audio frame. For each sample in the block identified by the common time offset for the interval, one method for combining includes multiplying the sample by a value of a first weighting function, multiplying the corresponding sample from the input frame by a value of a second weighting function, and adding the resulting products to generate a modified sample.

The common offset for an interval can be determined using a variety of techniques. One technique determines an offset for an average audio signal created by averaging corresponding samples from the various channels of the multi-channel audio signal. For the average audio signal, a search for a best match block identifies a single time offset for an average frame, and the time offset for the average frame is the common offset that the separate time scaling processes for the channels all use.

Another technique for finding a common offset combines offsets separately determined for the various channels. For each data channel, a search identifies an offset to a best match block for that channel, and the offsets for the same interval in the different channels are used (e.g., averaged) to determine a common offset for the interval.

Another technique for determining a common offset for an interval includes determining for each of a series of candidate offsets, an accumulated difference between respective blocks that a candidate offset identifies and respective frames. The common offset for the interval is the candidate offset that provides the smallest accumulated difference.

Yet another method for determining a common offset for a time interval uses an augmented audio data structure containing input audio data and parameters that simplify the time scaling process. For stereo audio, the augmented audio data structure includes the left and right frames, and for each pair of left and right frames, the augmented audio data structure includes a set of previously calculated offsets that correspond to the pair and to a set of time scales. The correct common offset for the selected time scale and interval can be extracted from the set of predetermined offsets for the set of time scales or found by interpolating between the predetermined offsets to determine a common offset corresponding to the selected interval and time scale.

One specific embodiment of the invention is a time scaling process for a stereo audio signal. For a stereo audio signal, the process includes partitioning left and right data that represent left and right channels of the stereo audio signal into left and right frames, respectively. Each right frame corresponds to one of the left frames and represents the right channel during a time interval in which the corresponding left frame represents the left channel. For each pair of corresponding left and right frames, the process determines a common offset that identifies a right block and a left block that the process uses in generating time-scaled left and right audio data. A variety of methods such as those described above can be used to determine the common offsets.

BRIEF DESCRIPTION OF THE DRAWINGS

Use of the same reference symbols in different figures indicates similar or identical items.

DETAILED DESCRIPTION

In accordance with an aspect of the invention, a time scaling process for stereo or other multi-channel audio signals avoids or reduces artifacts that cause apparent variations or oscillations in sound source location or timing oscillations for related sound sources. The time scaling generates time-scaled frames corresponding to the same time interval using a common time offset that is the same for all channels, instead of performing completely independent time scaling processes on the separate channels.

Figure 1A:
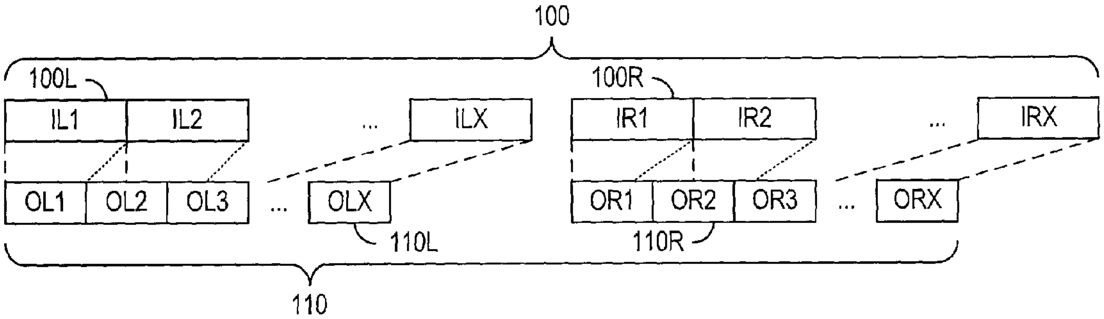
FIG. 1A illustrates time-scaled audio data frames output from time scaling of input audio data frames.
Figure 1B:
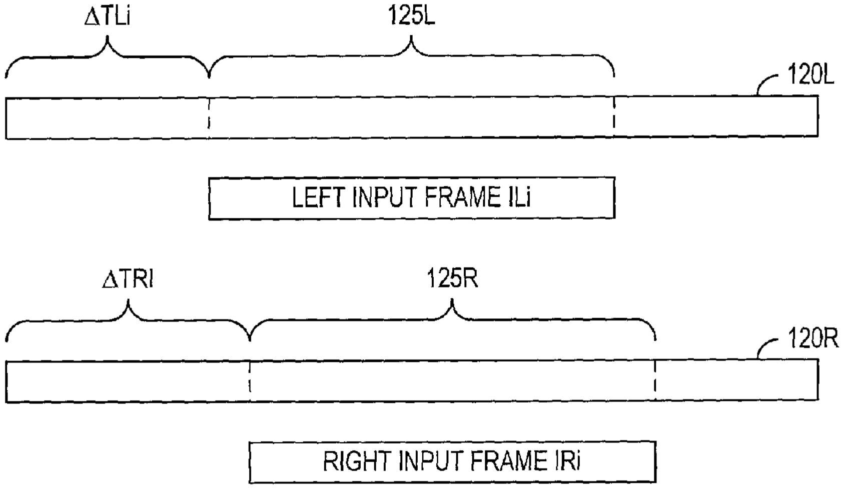
FIG. 1B illustrates offsets identifying left and right best matching blocks for the time scaling process of FIG. 1A.
Figure 2:
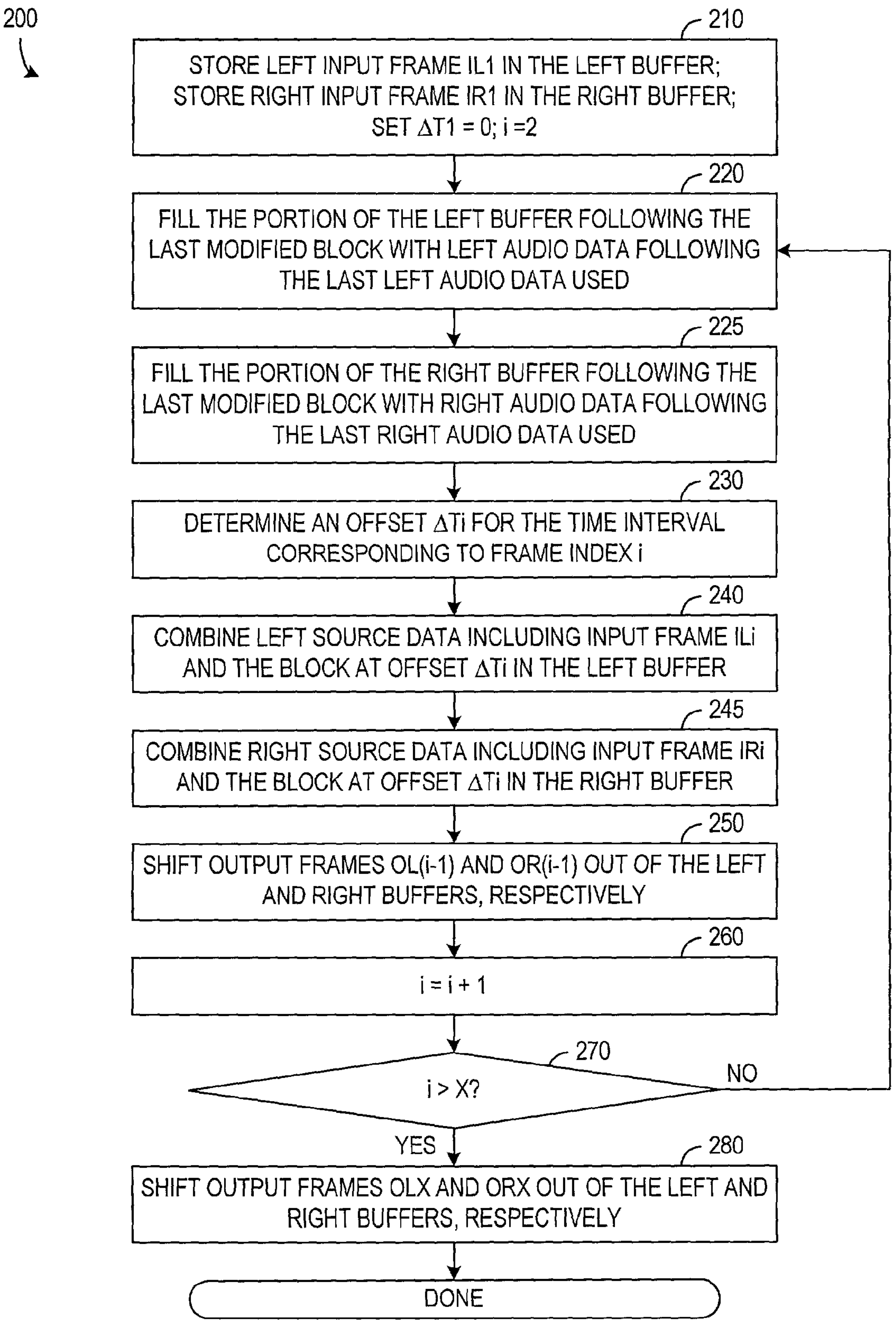
FIG. 2 is a flow diagram of a stereo audio time scaling process in accordance with an embodiment of the invention.

FIG. 2 is a flow diagram of an exemplary time scaling process 200 for a stereo audio signal represented by left and right channel data 100L and 100R (FIG. 1A). In the exemplary embodiment, left channel data 100L includes samples of a left audio channel of a stereo audio signal, and right channel data 100R includes samples of a right audio channel of the stereo audio signal. The left and right channel data 100L and 100R are divided into fixed sized frames IL1 to ILX and IR1 to IRX, and for a frame index i ranging from 1 to X, frames ILi and IRi represent a time interval that a frame index i identifies in the stereo audio signal.

Time scaling process 200 begins with an initialization step 210. Initialization step 210 includes storing the first left and right input frames IL1 and IR1 in respective left and right buffers, setting a common time offset ΔT1 for the first time interval equal to zero, and setting an initial value for frame index i to two to designate the next left and right input frames to be processed. Generally, left input frames IL1 to ILX are sequentially combined into the left buffer to generate an audio data stream for the left audio channel, and right input frames IR1 to IRX are sequentially combined into the right buffer to generate an audio data stream for the right audio channel. Step 210 stores input frames IL1 and IR1 at the beginning of the left and right buffer, respectively.

Steps 220 and 225 respectively fill the left and right buffers with source data that follows the last source data used. Initially, steps 220 and 225 load the next left and right input frames IL2 and IR2 into the respective left and right buffers, and sequentially following source data may follow frames IL2 and IR2 depending on the selected size of the buffers. Generally, the left and right buffers include at least n+m consecutive samples, where m is the number of samples in an input frame and n is the number of samples in an output frame. The source data filling the left and right buffers is at storage locations following the last modified blocks of data in the respective left and right buffers. For the first execution of steps 220 and 225, the last modified blocks in left and right buffers are input frames IL1 and IR1. For subsequent executions of steps 220 and 225, the last modified blocks are left and right blocks that a common offset identified in the respective buffers.

Figure 3A:
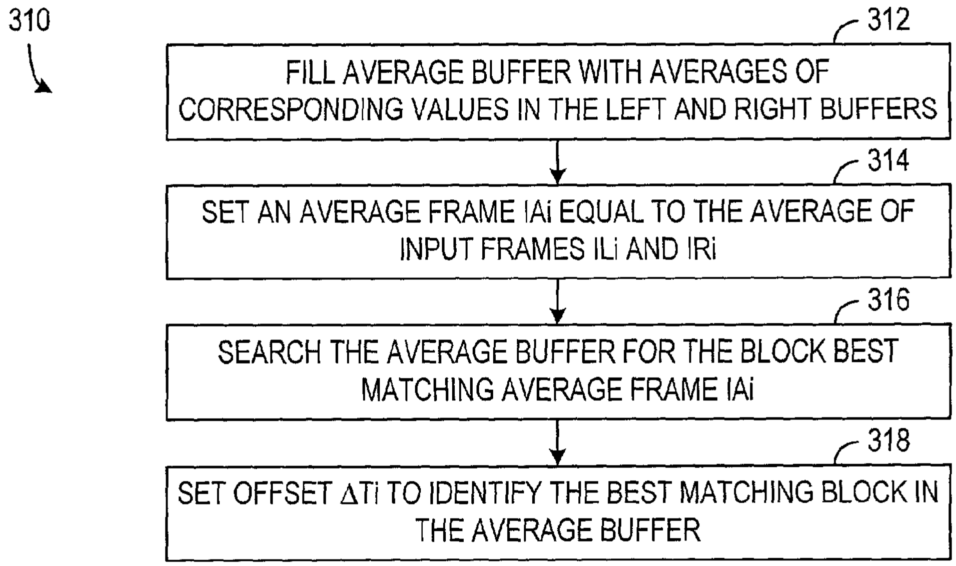
FIGS. 3A, 3B, and 3C are flow diagrams of alternative methods for identifying common offsets used in time scaling of multi-channel audio.
Figure 3B:
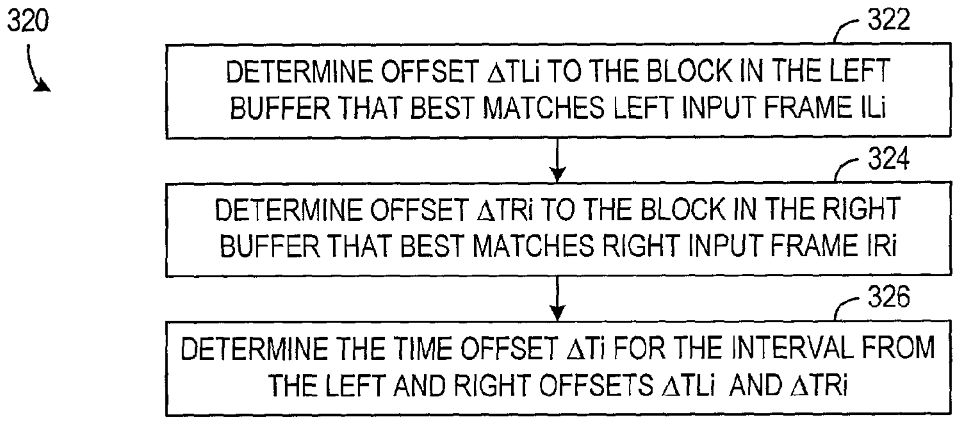
Figure 3C:
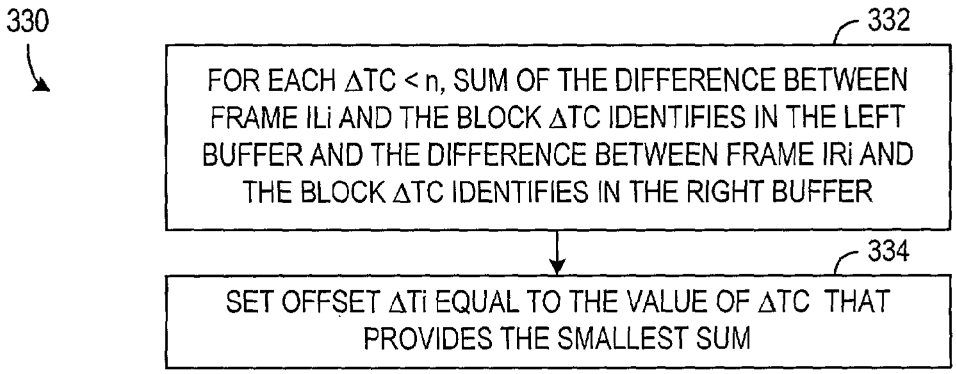

Step 230 determines a common time offset ΔTi for the time interval identified by frame index i. The common time offset ΔTi is used in the time scaling processes for the left and right channels, and one exemplary time scaling method using common time offsets is illustrated in FIG. 2 and described further below. FIGS. 3A, 3B, and 3C are flow diagrams of three alternative methods for determining common time offset ΔTi.

In process 310 of FIG. 3A, a step 312 prepares an average buffer that contains samples that are the average of corresponding samples from the left and right buffers. Similarly, step 314 prepares an average input frame containing samples that are the averages of corresponding samples in left and right input frames ILi and IRi. Step 316 then searches the average buffer for a block of samples that best matches the average input frame and is less than g samples from the beginning of the average buffer, g being the larger of the number m of samples in an input frame and the number n of samples in an output frame. Step 318 sets common offset ΔTi equal to the offset from the start of the average buffer to the best matching block found in step 316.

Alternatively, in process 320 of FIG. 3B, step 322 searches the left buffer for a block that is no more than g samples from the start of the left buffer and best matches left input frame ILi. Step 324 similarly searches the right buffer for a block that is no more than g samples from the start of the right buffer and best matches right input frame IRi. As noted above, left and right time offsets ΔTLi and ΔTRi respectively identifying left and right best match blocks will generally differ because the left and right audio signals differ. Step 326 uses left and right offsets ΔTLi and ΔTRi to determine common offset ΔTi for the time interval. In specific examples, step 326 sets common offset ΔTi equal to the average or mean of left and right offsets ΔTLi and ΔTRi or selects one of offsets ΔTLi and ΔTRi as common offset ΔTi.

Process 330 of FIG. 3C provides yet another alternative determination process for the common offset ΔTi associated with time interval i. In particular, for each candidate offset ΔTC between 0 and g, step 332 determines a sum of the absolute or squared differences between samples in left input frame ILi and corresponding samples in the block in the left buffer at offset ΔTC and the absolute or squared difference between samples in right input frame IRi and corresponding samples in the block in the right buffer at offset ΔTC. Step 334 sets common offset ΔTi equal to the candidate offset ΔTC that provides the smallest sum.

After step 230 of process 200 (FIG. 2) determines common offset ΔTi, step 240 combines g samples of left source data including left input frame ILi (i.e., the input frame that step 220 just stored in the left buffer) with a block of g samples that common offset ΔTi identifies in the left buffer. For a time scale greater than one, g is equal to m, and m samples in input frame ILi are thus shifted forward in time for combination with m samples having earlier time indices, effecting time compression. Step 245 similarly combines g samples of right source data including right input frame IRi with a block of g samples that common offset ΔTi identifies in the right buffer, and for a time scale greater than one, step 245 shifts samples in right input frame IRi forward in time for combination with earlier matching samples.

Figure 4:
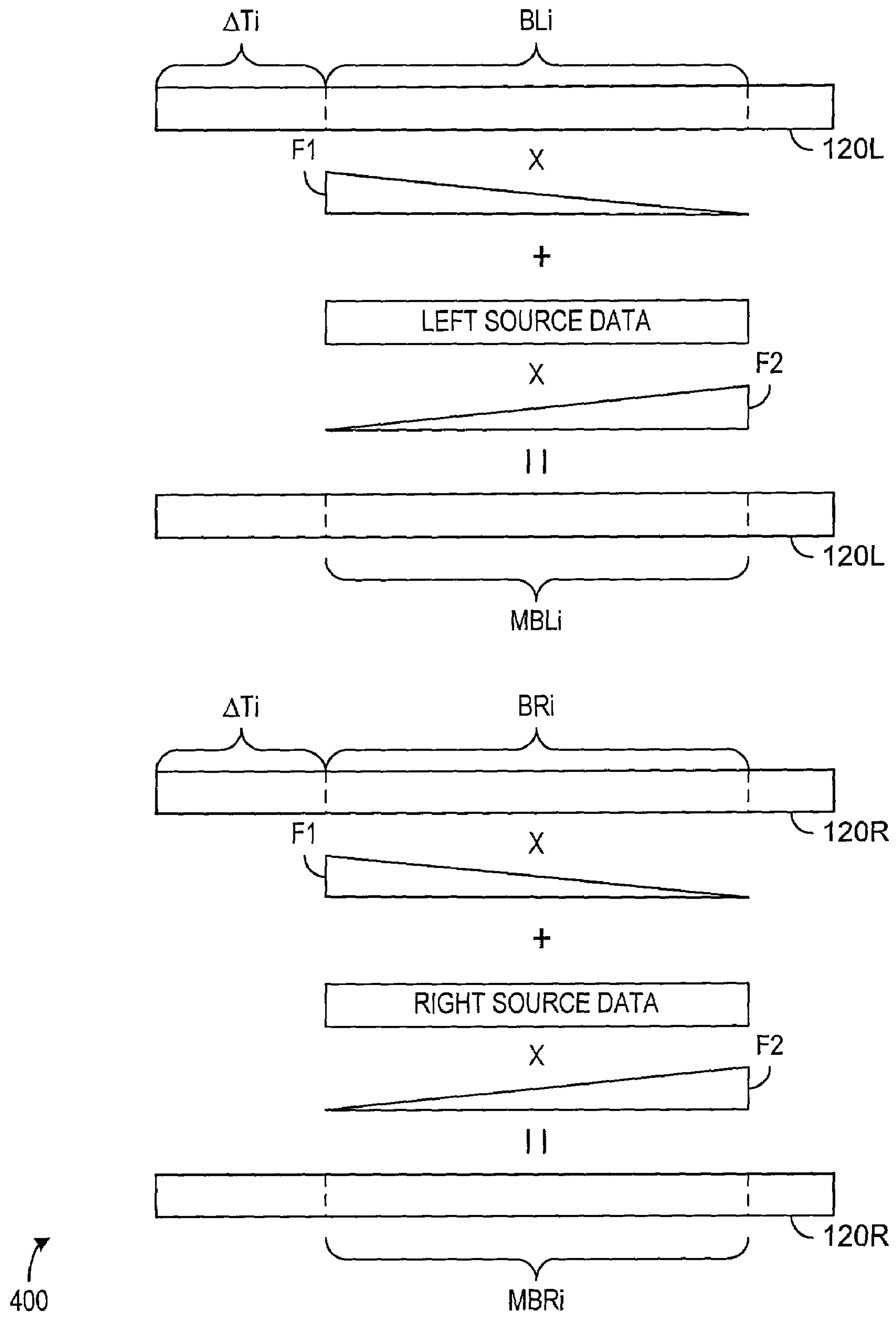
FIG. 4 illustrates generation of left and right time-scaled data by combining left and right source data with samples in left and right buffers.

The specific combination process employed in steps 240 and 245 depends on the specific time scaling process employed. FIG. 4 illustrates an exemplary combination process 400. For the combination process, common time offset ΔTi identifies left and right blocks BLi and BRi in the left and right buffers, respectively. Each of blocks BLi and BRi contains g samples as does the source data, and a sample index j between 1 and g can be assigned to identify individual samples according to the sample's order in the frame or block. For each value of the sample index j, combination process 400 multiplies the corresponding sample in block BLi in the left buffer by a corresponding value F1(j) of a weighting function F1, multiplies the corresponding sample in input frame ILi by a corresponding value F2(j) of a weighting function F2, and sums the two products to generate a modified sample in the left buffer. Similarly, combination process 400 multiplies value F1(j) by the sample having sample index j in block BRi, multiplies value F2(j) by the corresponding sample in input frame IRi, and sums the two products to generate a modified sample in the right buffer.

Weighting functions F1 and F2 vary with the sample index j and are generally such that the two weight values corresponding to the same sample index add up to one (e.g., F1(j)+F2(j)=1 for all j=1 to g). In FIG. 4, weighting function F1 has value 1 at the beginning of the block so that the modified sample is continuous with preceding samples in the left or right buffer. Weighting function F2 has value 1 at the end of the block so that the modified sample will be continuous with input samples to be added to left or right buffer in the next execution of step 220 or 225 (FIG. 2). More generally, the weighting functions depend on the specific time scaling process employed.

After the combination processes 240 and 245 of FIG. 2, step 250 left shifts the contents of the left buffer by n samples to output a left output frame OL(i−1) and left shifts the contents of the right buffer by n samples to output a right output frame OR(i−1). Steps 260 and 270 increment frame index i and either jump back to step 220 if there is another input frame to be time scaled or ends the time scaling process 200 if all of the input frames have been processed. In the re-execution of steps 220 and 225, input data following the source data combined in steps 240 and 245 are stored in respective left and right buffers in locations immediately following the last modified blocks as shifted by step 250. For time compression (g=n), left and right input frames ILi and IRi for the new value of index i are stored in respective left and right buffers in locations immediately following the last modified blocks as shifted by step 250. For time expansion, the filling data sequentially follows the last used source data in respective left and right input audio data streams. Step 230 then determines the next common offset ΔTi from the beginnings of the left and right buffers for the re-execution of combination steps 240 and 245.

After the last input frames have been combined into the respective buffers, step 280 shifts the last left and right output frames OLX and ORX out of the respective left and right buffers. Process 200 is then done.

Figure 5A:
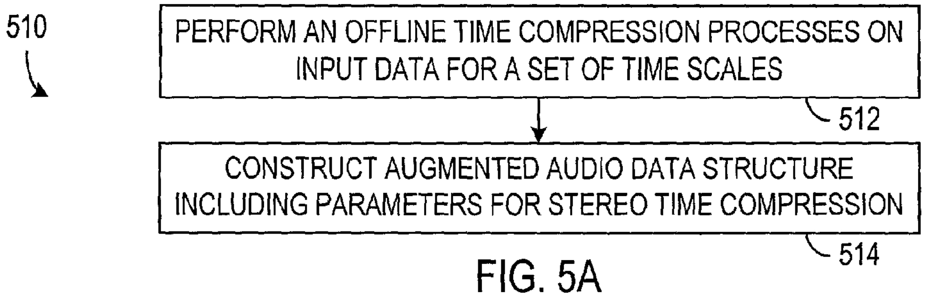
FIG. 5A is a flow diagram of a process for generating an augmented audio data structure that simplifies stereo audio time scaling.
Figure 5B:
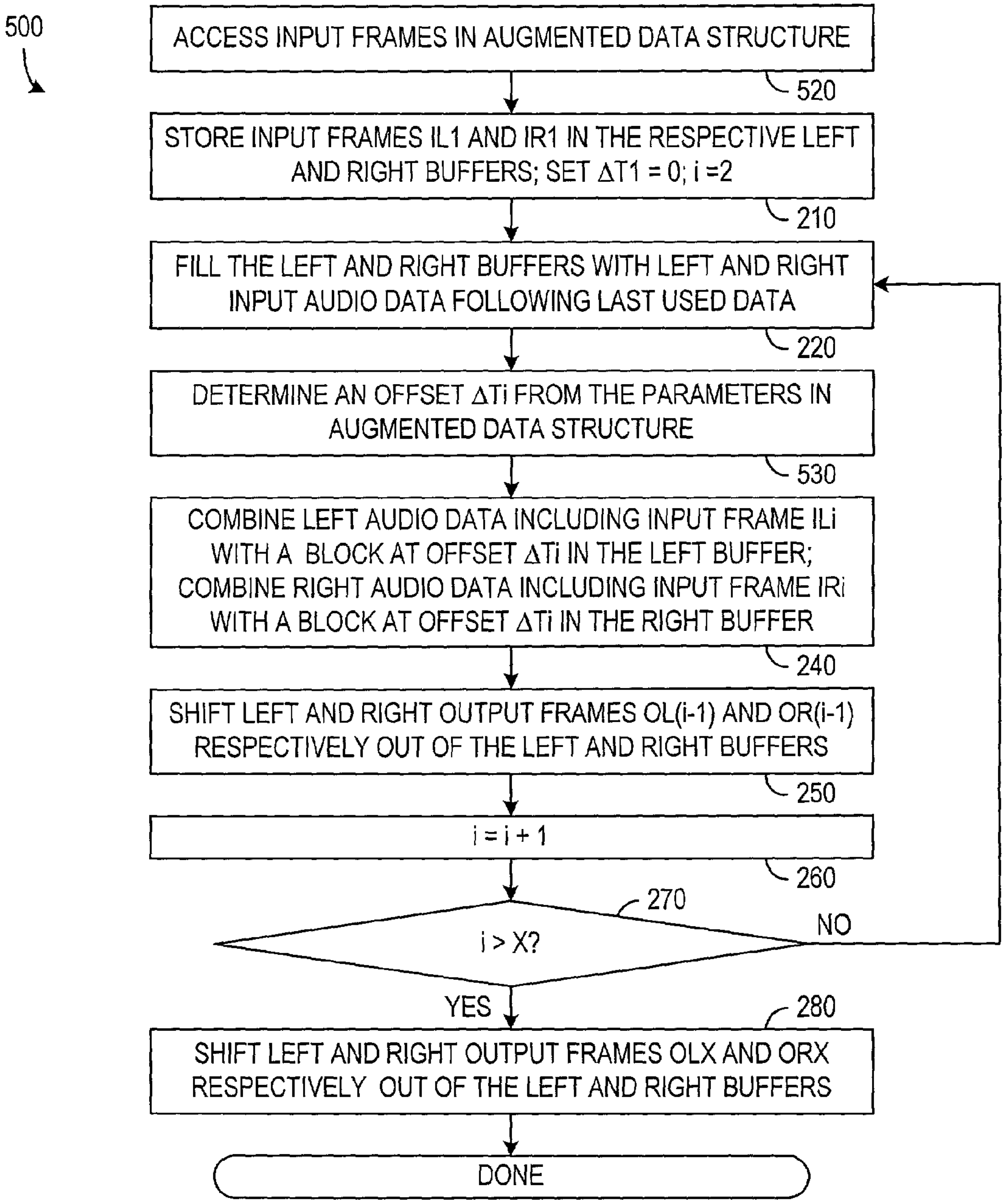
FIG. 5B is a flow diagram of a stereo audio time scaling process using an augmented audio data structure to reduce the processing burden during real-time time scaling of a stereo audio signal.

FIGS. 5A and 5B illustrate processes 510 and 500 in accordance with an embodiment of the invention using an augmented audio data structure. Process 500 is well suited for real-time time scaling of audio data in a presentation system that has a relatively small amount of available processing power. A co-filed patent application entitled "Digital Audio With Parameters For Real-Time Time Scaling", application Ser. No. 10/010,514, further describes real-time time scaling methods suitable for low power systems and is hereby incorporated by reference herein in its entirety.

Process 510 is performed before real-time time scaling process 500 and preprocesses a stereo audio signal to construct an augmented data structure containing parameters that will facilitate time scaling in a low-computing-power presentation system. In particular, step 512 repeatedly time scales the same stereo audio signal with each time scaling operation using a different time scale. From the input stereo audio, step 512 determines a set of common time offsets ΔT(i,k), where i is the frame index and k is a time scale index. Each common time offset ΔT(i,k) is for use in time scaling of both left and right frames corresponding to frame index i when time scaling by a time scale corresponding to time scale index k.

Step 514 constructs the augmented data structure that includes the determined common time offsets ΔT(i,k) and the left and right input frames of the stereo audio. The augmented data structure can then be stored on a media or transmitted to a presentation system.

The real-time time scaling process 500 accesses the augmented data structure in step 520 and then in step 210 initializes the left and right buffers, the first common offset ΔT1, and the frame index i as described above. Time scaling process 500 then continues substantially as described above in regard to process 200 of FIG. 2 except that a step 530 determines the common offset ΔTi from the parameters in the augmented audio data.

If the current time scale matches one of the time scales that process 510 used in time scaling the stereo audio data, the presentation system can use one of the predetermined common offsets ΔT(i,k) from the augmented audio data structure, and the presentation system is not required to calculate the common time offset. If the current time scale fails to match any of the time scales k that process 510 used in time scaling the stereo audio data, the presentation system can interpolate or extrapolate the provided time offsets ΔT(i,k) to determine the common time offset for the current frame index and time scale. In either case, the calculations of time index that the presentation system performs are less complex and less time consuming that the searches for best match blocks described above.

Although the invention has been described with reference to particular embodiments, the description is only an example of the invention's application and should not be taken as a limitation. For example, although the above description concentrates on a stereo (or two-channel) audio signal, the principles of the invention are also suitable for use with multi-channel audio signals having three or more channels. Additionally, although the described embodiments employ specific uses of time offsets in time scaling, aspects of the invention apply to time scaling processes that use time offsets or sample offsets in different manners. Various other adaptations and combinations of features of the embodiments disclosed are within the scope of the invention as defined by the following claims.

What is claimed is:

1. A time scaling process for a multi-channel audio signal, comprising:

partitioning the audio signal into a plurality of intervals, each interval corresponding to a frame in each of multiple data channels of the multi-channel audio signal;

for each interval, determining an offset for the interval, wherein determining an offset for an interval comprises:

determining an average frame from a combination of all frames corresponding to the interval;

searching for a best match block that best matches the average frame; and selecting for the offset of the interval a value that identifies the best match block found for the average frame; and time-scaling the multiple data channels, wherein for each of the frames, time scaling comprises using the offset for the interval corresponding to the frame when time scaling the frame.

2. The time scaling process of claim 1, wherein using the offset when time scaling a frame comprises using the offset to identify a block that is combined with the frame.

3. The process of claim 2, wherein for each of the frames, time scaling further comprises combining samples of the block with corresponding samples from the frame.

4. The process of claim 3, wherein for each sample in the block that is combined with corresponding samples from the frame, combining comprises:

multiplying the sample by a value of a first weighting function;

multiplying the corresponding sample from the frame by a value of a second weighting function; and adding products resulting from the multiplying to generate a modified sample.

5. The process of claim 1, wherein searching for the best match block comprises searching a buffer that contains samples found by averaging corresponding samples used in time scaling of the multiple data channels.

* * * * *